United States Patent
Soder

(10) Patent No.: US 12,223,459 B2
(45) Date of Patent: Feb. 11, 2025

(54) METHOD FOR DETERMINING A FINANCIAL AMOUNT FOR A LOGISTICAL PERFORMANCE IN A PRODUCTION SYSTEM, AND PRODUCTION SYSTEM COMPRISING A VEHICLE FOR CARRYING OUT THE METHOD

(71) Applicant: SEW-EURODRIVE GMBH & CO. KG, Bruchsal (DE)

(72) Inventor: Johann Soder, Hambrücken (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 284 days.

(21) Appl. No.: 16/095,446

(22) PCT Filed: Mar. 28, 2017

(86) PCT No.: PCT/EP2017/025063
§ 371 (c)(1),
(2) Date: Oct. 22, 2018

(87) PCT Pub. No.: WO2017/182131
PCT Pub. Date: Oct. 26, 2017

(65) Prior Publication Data
US 2019/0147557 A1    May 16, 2019

(30) Foreign Application Priority Data
Apr. 22, 2016   (DE) .................. 10 2016 004 972.3

(51) Int. Cl.
*G06Q 10/08*  (2024.01)
*G01G 19/08*  (2006.01)
(Continued)

(52) U.S. Cl.
CPC ............. *G06Q 10/08* (2013.01); *G01G 19/08* (2013.01); *G01G 19/086* (2013.01); *G06Q 10/06395* (2013.01); *G06Q 50/04* (2013.01)

(58) Field of Classification Search
CPC ........ G06Q 50/28; G06Q 10/08; G06Q 50/04; G06Q 10/06395; G01G 19/086; G01G 19/08; Y02P 90/02
See application file for complete search history.

(56) References Cited

U.S. PATENT DOCUMENTS

| | | | |
|---|---|---|---|
| 2009/0055232 A1* | 2/2009 | Bruno | G06Q 10/08 700/229 |
| 2013/0041576 A1* | 2/2013 | Switkes | G08G 1/22 701/123 |
| 2015/0292934 A1 | 10/2015 | Baumgaertner et al. | |
| 2016/0078694 A1* | 3/2016 | Swift | G07C 5/085 701/34.2 |

FOREIGN PATENT DOCUMENTS

| | | |
|---|---|---|
| DE | 102012222854 A1 | 6/2014 |
| EP | 2500871 A1 | 9/2012 |

(Continued)

OTHER PUBLICATIONS

Schulze, et al., The Approach of Automated Guided Vehicle Systems, 2006 IEEE international conference on service operations and logistics, and informatics, pp. 522-527 (2006) (Year: 2006).*

(Continued)

*Primary Examiner* — Charles Guiliano
(74) *Attorney, Agent, or Firm* — Carter, DeLuca & Farrell LLP

(57) ABSTRACT

In a method for determining a financial amount for a logistical performance in a production system, and a production system having a vehicle for carrying out the method, an item of order information, in particular an item of driving-order information, is transmitted to a vehicle in the production system; the vehicle approaches the workstations in sequence, and an individual production-method step is (Continued)

performed at the respective workstation on the component transported by the vehicle in each case; the logistical performance is detected in the process, in particular the number of approached workstations, the traveled distance, and/or the number of components transported by the vehicle; and the detected logistical performance is transmitted via an Internet connection to a server, which is located at a position that is geographically at a distance from the production system. The server uses the detected logistical performance to determine a value, in particular a financial value, taking into account the number, type and/or position of the workstations of the production system and/or the driving distances.

16 Claims, 1 Drawing Sheet

(51) Int. Cl.
    *G06Q 10/0639*     (2023.01)
    *G06Q 50/04*     (2012.01)

(56) References Cited

FOREIGN PATENT DOCUMENTS

WO     WO 2011/116874 A2     9/2011
WO     WO 2013/075280 A1     5/2013

OTHER PUBLICATIONS

International Preliminary Report on Patentability issued in International Application No. PCT/EP2017/025063, dated Nov. 1, 2018 (13 pages total).
European Office Action issued from the European Patent Office to corresponding Application No. 17717628.6 on Mar. 30, 2020, 7 pages.
International Search Report issued May 29, 2017, in International Application No. PCT/EP2017/025063 (English-language translation).

\* cited by examiner

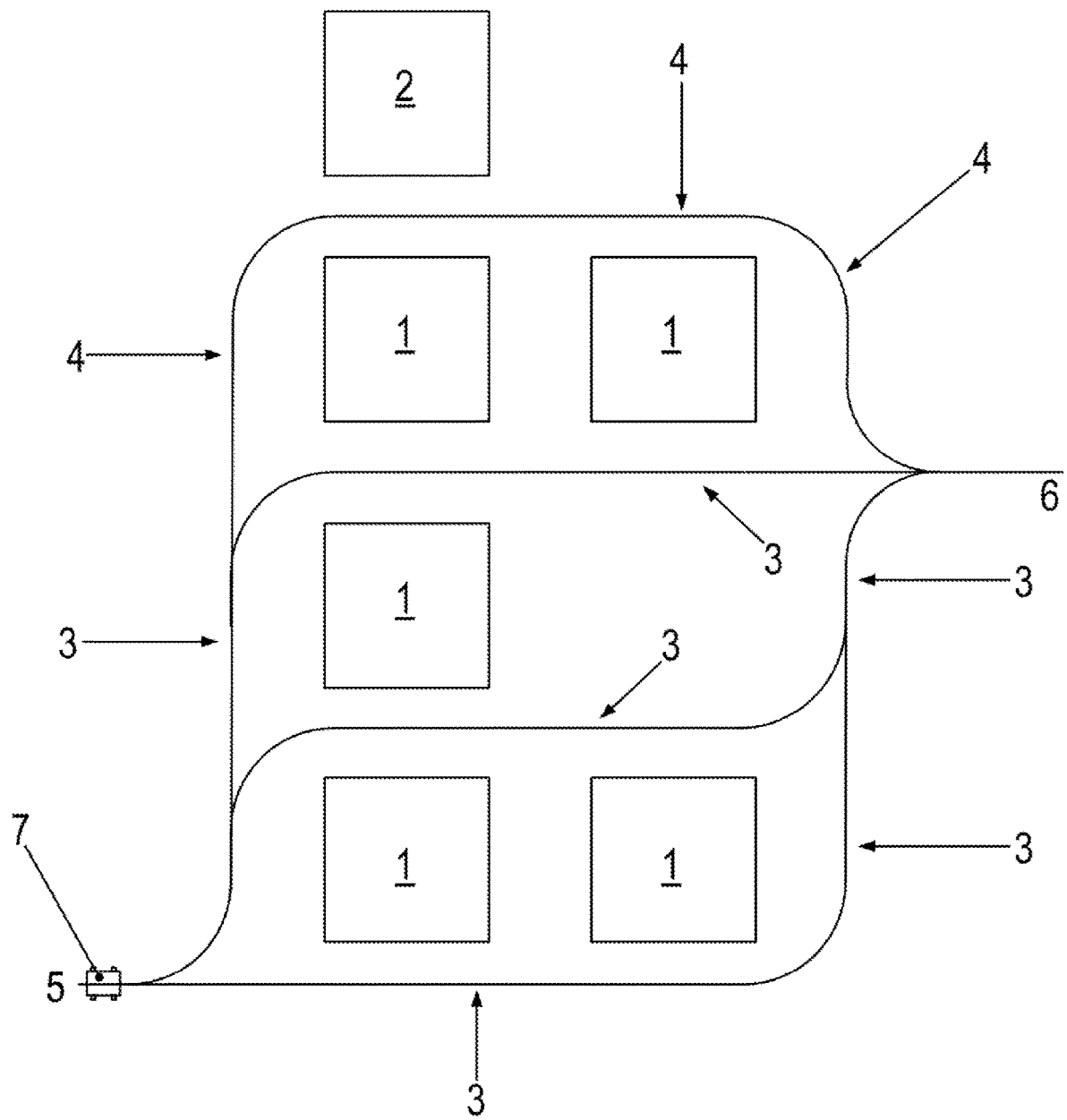

METHOD FOR DETERMINING A FINANCIAL AMOUNT FOR A LOGISTICAL PERFORMANCE IN A PRODUCTION SYSTEM, AND PRODUCTION SYSTEM COMPRISING A VEHICLE FOR CARRYING OUT THE METHOD

FIELD OF THE INVENTION

The present invention relates to a method for determining a financial amount for a logistical performance in a production system, and to a production system comprising a vehicle for carrying out the method.

BACKGROUND INFORMATION

It is generally known that a logistical performance is to be provided in a production system, for instance by conveyor lines.

SUMMARY

Example embodiments of the present invention provide for simplifying a flexible operation of a production system.

According to an example embodiment of the present invention, in a method for determining a financial amount for a logistical performance in a production system includes: an item of order information, in particular an item of driving-order information, is transmitted to a vehicle in the production system; the vehicle approaches workstations in sequence and, in particular, an individual production-method step is performed at the respective workstation on the respective component transported by the vehicle; the logistical performance is detected in the process, in particular the number of approached workstations, the traveled distance, and/or the number of components transported by the vehicle; the detected logistical performance is transmitted via an Internet connection to a server, which is located at a position that is geographically at a distance from the production system; and the server uses the detected logistical performance to determine a value, in particular a financial value, taking into account the number, type and/or position of the workstations of the production system, and/or the driving distances.

This has the advantage that the logistical performance is billable as such. As a result, the manufacturer of a product need not absorb any investments for intralogistical performance itself but instead is able to simply purchase this performance from a vendor of logistical performance. This vendor in turn is located at a geographically different position, for example, where the vendor operates the server which is used to determine the financial amount and to prepare the invoice. The vendor has the advantage of being able to employ the vehicles in a flexible manner and for different applications. For example, when the manufacturer produces fewer products, then one of its vehicles may be used in a different production system. If greater intralogistical performance is required due to an expansion of the production system, for instance, the higher-level control of the production system informs the vendor of the new topography, i.e. also the expansion, and the server then prepares the financial amount that corresponds to the logistical performance. If a workstation or a path that is unknown to the server were to be approached, then an error state would occur and be reported and/or indicated.

The detected values may include: the mass of the transported component; the traveled distance; the number, type and/or position of the approached workstations; and/or the number of the components transported by the vehicle.

This has the advantage that the logistical performance is able to be determined in an uncomplicated manner.

If the production system has been changed, in particular expanded, the corresponding information in connection with the changed number, type and/or position of the workstations of the production system and/or driving paths may be transmitted to the server, which then takes this information into account when determining the value, in particular the financial value. Firstly, this offers the advantage that an invoice is able to be prepared for the logistical performance, and secondly, the topographical information located on the server is able to be verified and an error message possibly be generated, as the case may be.

The electrical energy inductively transmitted to the vehicle may be determined and taken into account as logistical performance or at least as part of the logistical performance. This offers the advantage that a simple basis may be established for determining the logistical performance.

The logistical performance may be determined from the value of the mass of the transported component and from the value of the traveled distance in each case, in particular as a function of the product of the value of the mass of the transported component and the value of the traveled distance. This is considered advantageous insofar as the determination is easy to performed.

The mass of the transported component may be detected with the aid of a force sensor in each case. This offers the advantage of allowing for a precise detection.

The torque of the drive of the vehicle may be determined and the mass of the transported component may be determined on that basis. This is considered advantageous because no separate sensor is required inasmuch as the drive is equipped with an electric motor supplied by a power inverter as it is, and the signal electronics of the power inverter determine a modeled value of the torque for the motor control. As a result, it is possible to use the torque value, which is available anyway.

The value of the respectively traveled distance may be determined from the time characteristic of the detected position values of the vehicle. This is considered advantageous because it makes for an easy determination of the logistical performance.

According to an example embodiment of the present invention, in a production system having a vehicle for carrying out an aforementioned method, the vehicle has a position-determination system; and/or the vehicle has a force sensor, which detects the mass of the respective component accommodated and transported by the vehicle, the force sensor in particular being situated between an accommodation device of the vehicle and the rest of the vehicle, and the component is accommodated by the accommodation device; the vehicle includes a device for determining the torque of the drive of the vehicle, which is in an operative connection with a device for determining the weight force and/or the mass of the component accommodated and transported by the vehicle in each case.

This offers the advantage that the path is able to be easily determined and that the mass may be determined by a force sensor or without the use of a separate sensor. The respective logistical performance is therefore able to be determined in a precise, comprehensible and uncomplicated manner.

Further features and aspects of example embodiments of the present invention are described in greater detail below with reference to the FIGURE.

BRIEF DESCRIPTION OF THE DRAWING

In FIG. 1, the expansion of a production system is schematically illustrated.

DETAILED DESCRIPTION

The production system without an expansion has a vehicle 7, which conveys a component to be processed at workstations 1 via an incoming driving path to the production system where it is then sequentially driven to workstations 1 required for the production of a respective product by traveling along a driving path. It is not necessary to approach all workstations 1.

From a higher-level control, vehicle 7 receives a production order which includes the sequence of workstations 1 to be visited. Driving paths 3 are then traversed, and vehicle 7 is finally moved out of the area via outgoing driving path 6.

The logistical performance, in particular the drive performance and transport performance, of vehicle 7 is detected. The traveled driving distance, the mass and/or the number of transported components and/or the type and/or the weight of the components transported by vehicle 7 as well as the number of approached workstations 1 is/are detected for this purpose and transmitted to the higher-level control. A determination of the logistical performance based on the product of the value of the mass and the traveled distance is particularly uncomplicated. The mass may be determined either by a force sensor, which is disposed between the component, in particular its accommodation, and the rest of the vehicle. Alternatively, the mass is also able to be determined from a modeled value or an estimated value of the torque, this torque value being determined by the signal electronics of the power inverter, which supplies the electric motor of the travel drive of vehicle 7.

The higher-level control is connected to a server via a communications channel, e.g., via an Internet connection. This server determines a financial amount as a function of the detected and the transmitted logistical performance and prepares a corresponding invoice.

If the production system is to be expanded, i.e. if a further workstation 2 and/or a further driving path is/are added to the driving path network, then the determination of the logistical performance will be adapted, or in other words, the expansion of the production system will be taken into account when determining the logistical performance.

The topographical change, such as the position of the further workstation, is transmitted not only to the higher-level control but also to the server. It is therefore also possible to take the expansion into account when determining the financial amount.

Vehicle 7 has on its underside a secondary winding, which is able to be inductively coupled with a primary conductor that is installed on the floor and may be acted upon by a medium-frequency alternating current. The medium frequency in this case is between, for example, 10 kHz and 1000 kHz. Connected to the secondary winding, in series and/or serially, is a capacitance such that the resonant frequency of the oscillating circuit created in this manner corresponds substantially to the frequency of the alternating current impressed into the primary conductor.

This allows for an inductive supply of vehicle 7.

The primary conductor is installed along the driving paths (3, 4) of vehicle 7 on the floor.

In a further exemplary embodiment according to the present invention, the primary conductor is arranged as a winding, in particular as a ring winding.

The floor must therefore not be cut open in an elongated shape along the driving paths (3, 4) of vehicle 7 in order to allow for the installation of the primary conductor, but needs to be opened up only in the region of the compact area of the winding. In the particular space region around the winding where a sufficient inductive coupling is achievable between the primary winding and the secondary winding of vehicle 7, the energy store of vehicle 7 is therefore able to be charged, and outside the mentioned space region, vehicle 7, in particular its drive, the control and the drives of the robot arm, is able to be supplied by the energy store.

The higher-level control is situated within the production system.

LIST OF REFERENCE NUMERALS 1 workstation
2 additional workstation
3 driving path
4 further driving path
5 incoming driving path
6 outgoing driving path
7 vehicle

The invention claimed is:

1. A method, comprising:
    transmitting an item of order information to a vehicle of a production system, the vehicle including a secondary winding, a position-determination system, a force sensor, and a torque sensor, the force sensor adapted to detect a mass of a component accommodated and transported by the vehicle, the force sensor being arranged between an accommodation device of the vehicle and the rest of the vehicle, the accommodation device adapted to accommodate the component, the torque sensor adapted to detecting torque of a drive of the vehicle, the torque sensor being in operative connection with the force sensor, the production system includes a primary conductor installed in a floor of the production system and along a travel path of the vehicle, the primary conductor inductively coupled with the secondary winding and inductively supplying electrical energy to the vehicle;
    transporting the vehicle and the component that is accommodated in the accommodation device to workstations of the production system in sequence according to the order information, the vehicle traveling a distance during the transporting;
    performing a respective production-method step at a corresponding workstation on the component that is accommodated and transported by the vehicle;
    detecting a value of the mass of the component accommodated and transported by the vehicle by the force sensor detecting the mass of the component or based on the torque sensor detecting the torque of the drive of the vehicle;
    determining a logistical performance from the detected value and as a function of a product of the value of the mass of the component and a value of the distance traveled by the vehicle during the transporting;
    transmitting the determined logistical performance via an Internet connection to a server; and
    determining, by the server, a value based on the determined logistical performance.

2. The method according to claim 1, wherein the item of order information includes an item of driving order information.

3. The method according to claim 1, wherein the server is arranged at a position that is geographically located at a distance from the production system.

4. The method according to claim 1, wherein the value determined by the server includes a financial value.

5. The method according to claim 1, wherein the value determined by the server is determined in accordance with a number, a type, and/or a position of the workstations of the production system and/or driving paths of the vehicle of the production system.

6. The method according to claim 1, wherein, if the production system is changed and/or expanded, corresponding information relating to a changed and/or expanded number, type and/or position of the workstations of the production system and/or the driving paths is transmitted to the server, the server determining the value based on the corresponding information.

7. The method according to claim 1, wherein electrical energy inductively transmitted to the vehicle is determined and taken into account at least as a part of the logistical performance.

8. The method according to claim 1, wherein the value of the distance traveled by the vehicle during the transporting is determined from a time characteristic of detected position values of the vehicle.

9. The method according to claim 1, wherein the production system is adapted to perform the method.

10. The method according to claim 1, wherein the primary conductor inductively supplies electrical energy to the vehicle to charge an energy storage device of the vehicle.

11. The method according to claim 1, wherein electrical energy is supplied to a drive of the vehicle, a controller of the vehicle, and/or a drive of a robot arm of the vehicle from an energy storage device of the vehicle during a time that the vehicle is outside of a space region the primary conductor, and the primary conductor inductively supplies electrical energy to the vehicle to charge the energy storage device of the vehicle at a time that the vehicle is inside of the space region of the primary conductor.

12. The method according to claim 9, wherein the primary conductor inductively supplies electrical energy to the vehicle to charge an energy storage device of the vehicle.

13. The method according to claim 9, wherein electrical energy is supplied to a drive of the vehicle, a controller of the vehicle, and/or a drive of a robot arm of the vehicle from an energy storage device of the vehicle during a time that the vehicle is outside of a space region the primary conductor, and the primary conductor inductively supplies electrical energy to the vehicle to charge the energy storage device of the vehicle at a time that the vehicle is inside of the space region of the primary conductor.

14. A production system, comprising:
a vehicle including:
  a secondary winding;
  a position-determination system;
  a force sensor adapted to detect a mass of a component accommodated and transported by the vehicle, the force sensor being arranged between an accommodation device of the vehicle and the rest of the vehicle, the accommodation device adapted to accommodate the component; and
  a torque sensor adapted to determine torque of a drive of the vehicle, the torque sensor being in operative connection with the force sensor; and
a primary conductor installed in a floor of the production system and along a travel path of the vehicle, the primary conductor inductively coupled with the secondary winding an adapted to inductively supply electrical energy to the vehicle;
wherein the production system is adapted to perform a method including:
  transmitting an item of order information to the vehicle of the production system;
  transporting the vehicle and the component that is accommodated in the accommodation device to workstations of the production system in sequence according to the order information, the vehicle traveling a distance during the transporting;
  performing a respective production-method step at a corresponding workstation on the component that is accommodated and transported by the vehicle;
  detecting a value of the mass of the component accommodated and transported by the vehicle by the force sensor detecting the mass of the component or based on the torque sensor detecting the torque of the drive of the vehicle;
  determining a logistical performance from the detected value and as a function of a product of the value of the mass of the component and a value of the distance traveled by the vehicle during the transporting;
  transmitting the determined logistical performance via an Internet connection to a server; and
  determining, by the server, a value based on the determined logistical performance.

15. The production system according to claim 14, wherein the primary conductor is adapted to inductively supply electrical energy to the vehicle to charge an energy storage device of the vehicle.

16. The production system according to claim 14, wherein an energy storage device of the vehicle is adapted to supply electrical energy to a drive of the vehicle, a controller of the vehicle, and/or a drive of a robot arm of the vehicle during a time that the vehicle is outside of a space region the primary conductor, and the primary conductor is adapted to inductively supply electrical energy to the vehicle to charge the energy storage device of the vehicle at a time that the vehicle is inside of the space region of the primary conductor.

* * * * *